May 5, 1931.  D. W. BERLIN  1,804,083
HEAT EXCHANGE DEVICE
Filed July 5, 1927  2 Sheets-Sheet 1
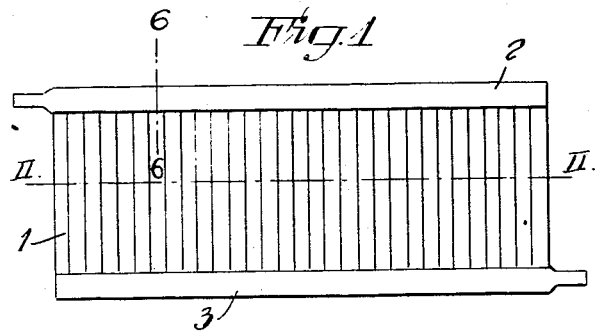
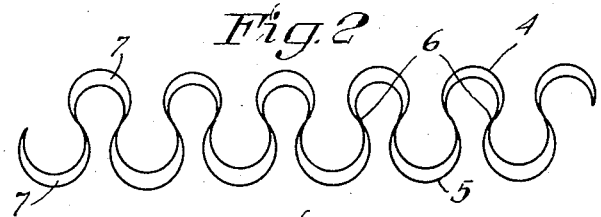
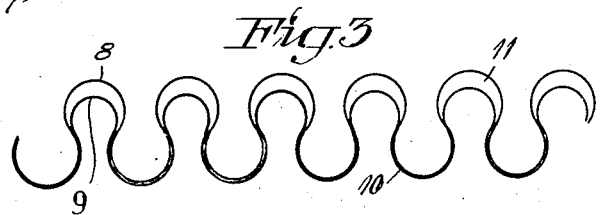
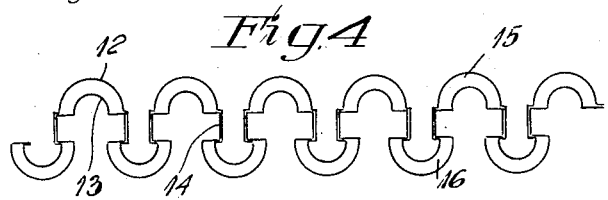
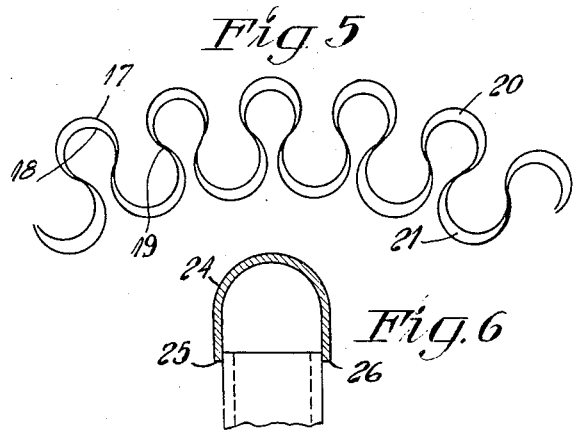
David W. Berlin,
by Byrnes, Townsend & Brickenstein

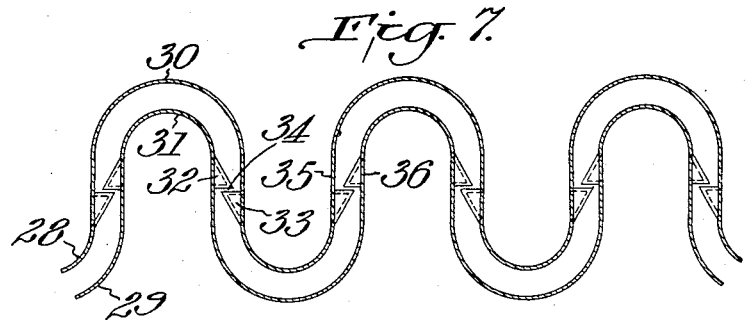
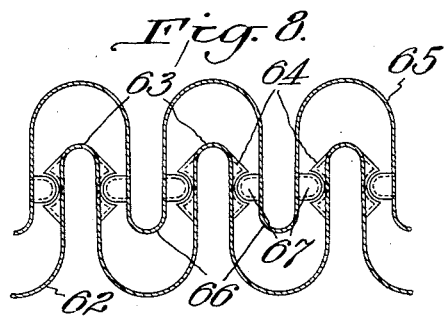
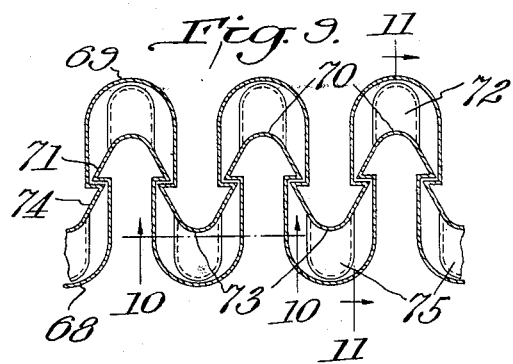
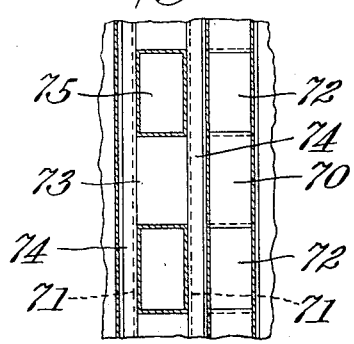
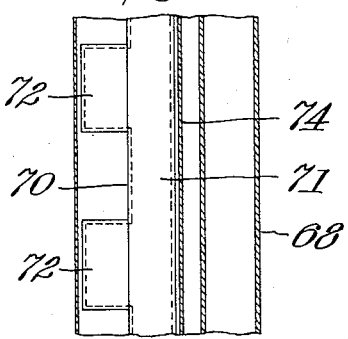

Patented May 5, 1931

1,804,083

UNITED STATES PATENT OFFICE

DAVID WERNER BERLIN, OF RASUNDA, SWEDEN

HEAT EXCHANGE DEVICE

Application filed July 5, 1927, Serial No. 203,592, and in Sweden August 17, 1926.

The present invention refers to a heating or cooling body for the heating or cooling respectively of dwelling rooms, office rooms, depositories, and for all other purposes for which it may come to use.

The types of heating and cooling bodies which are used at present for the heating or cooling of rooms etc. are bulky and difficult to dispose in such a manner that they will not interfere with the space or spoil the appearance of the room. Moreover, the known heaters and coolers are difficult to form with curved surfaces and difficult to build into walls.

This invention has for its object to provide a heating or cooling body of such fundamental construction that all of the drawbacks present in the existing heaters and coolers are removed while at the same time a cheaper and lighter heater or cooler respectively is obtained.

The invention consists in the provision of a heating or cooling body with double walls, the heating or cooling agent being located between the walls, and the invention is principally distinguished by the fact that the walls are corrugated and united so that the corrugations of the one wall engage in a locking or abutting manner into the corrugations of the other wall so as to cause the walls to tie and brace one another by means of the corrugations.

Moreover, the invention aims at making the corrugations and the mounting of the heating or cooling body in such a manner that channels for the heating or cooling agent respectively are formed both in the longitudinal and in the transversal direction of the corrugations.

In the accompanying drawings, a few embodiments of a heater or cooler according to the invention are shown by way of diagrammatical representation. Fig. 1 shows an elevation of a vertically disposed heater or cooler. Figs. 2, 3, 4 and 5 are horizontal sections on line 2—2 in Fig. 1 and to an enlarged scale of some embodiments of the corrugations of the outer walls engaging each other. Fig. 6 shows to an enlarged scale a vertical section on line 6—6 in Fig. 1. Fig. 7 is a cross section of a portion of a heater or cooler according to the invention, where the corrugation waves paralleling each other spaced in relatively close relation are provided with shoulder-like corrugations or chased portions engaging one another. Figs. 8 and 9 are views similar to Fig. 7 showing two modified forms of the invention. Figs. 10 and 11 are sections taken along lines 10—10 and 11—11 of Fig. 9. Figs. 8 and 9 are cross-sectional views similar to Fig. 7, showing modified forms of the invention.

The heater or cooler according to Fig. 1 consists of the corrugated lateral surfaces 1 which are provided at the top and the bottom with inlet and outlet channels 2 and 3 respectively that may be soldered, welded or pressed fast to said lateral surfaces. In Fig. 2, the two external walls 4 and 5 are corrugated so that the walls are caused to rest against each other at the points 6, while passages 7 are formed on both sides of the said points in the interior of the heater or cooler. As will be found from the drawing, the supporting points 6 are situated in the transitions between the corrugation curves on the narrower portion of the corrugation, so that the two corrugated lateral surfaces cannot be separated, but are held together by abutting against each other at said points. In Fig. 3, the external walls 8 and 9 are corrugated in such a manner that the walls are caused to rest against each other along the major portion of the corrugation curve 10 of the one side, while on the other hand they have corrugation curves of different sizes, so that passages 11 are formed. In Fig. 4, the external walls 12 and 13 are corrugated in such a manner that abutting surfaces are formed in the chased portions 14, while passages 15 and 16 are formed on both sides of the abutting surfaces 14. Fig. 5 shows a heater or cooler bent on a certain curvature, in which, similarly as in the arrangement according to Fig. 2, the corrugated external walls 17 and 18 support each other in the transitions between the corrugation curves at the points 19, passages 20 and 21 being formed on both sides.

The assembly of the side walls into a heating or cooling body may be effected in a number of ways. A simple and practical manner is to corrugate the two side walls each per se, after which the two corrugated walls are moved into each other from the ends, and channels or cap members 24 disposed on the end portions of the heater or cooler, as illustrated in Fig. 6, such channels being at the points 25 and 26 laterally attached to the side edges 27 of the heater or cooler respectively by means of welding, soldering, cementation and so forth, or by means of packings and screw devices.

According to Fig. 8, the corrugation waves 30 and 31 engaging into each other from the respective side walls 28 and 29 are provided with shoulder-like corrugations or chased portions 32 and 33, which in assembling the heater or cooler are moved past one another so that they are caused to bear against each other at the point 34 and lock the walls. For the purpose of bracing the straight lateral portions 35 and 36 of the corrugation waves, said portions may be provided with corrugations, the longitudinal direction of which extends more or less at right angles to the corrugation waves 30 and 31.

Fig. 8 shows a second embodiment of the heater or cooler where the corrugation waves 63 of the one wall 62 directed toward the other wall are provided with double shoulders 64, either chased or attached, while the corrugation waves 66 of the opposite wall 65 engaging into the first wall are provided with shoulders 67 fitted between the double shoulders of the other wall, so that locking is effected in both directions. In this embodiment, an external as well as an internal overpressure can be sustained by the shoulders. This embodiment may also be modified in so far that the one of the double shoulders is formed by the corrugation wave being shaped to a smaller width in alignment with the other shoulder, so that the bulges thus obtained will form an abutment or support for the shoulders of the opposite wall in the one direction.

Fig. 9 shows a third embodiment of the heater or cooler where the corrugation waves 70 of the one wall 61 directed toward the other wall 69 are provided with shoulders 71 sustaining the internal overpressure, as well as with shoulders 72 sustaining the external overpressure. These bulges may be chased both inwardly and outwardly. The outwardly chased bulges may be provided on the narrow corrugation wave and the inwardly chased bulges on the large corrugation wave. The corrugation waves 73 of the wall 69 directed toward the wall 68 are likewise provided, partly with shoulders 74 engaging the shoulders 71 of the wall 68, and partly with bulges 75 bearing against the wall 68. In this embodiment an internal overpressure is carried by the shoulders engaging each other, whereas an external overpressure is sustained by the bulges on the high portions of the corrugation waves, which portions bear against the opposite wall. In all of the embodiments herein described, there are formed within the heater or cooler, passages in the horizontal as well as in the vertical direction. There is nothing, however, that would prevent the passages from being shut off in the one direction, or that would prevent the heating or cooling agent from being conducted in one direction only. If in extraordinary cases it is desired to reinforce the heater or cooler still further, the various walls may be welded or riveted together at the supporting points. The corrugated walls are welded or soldered together around the outer edges of the heater or cooler, whereupon the necessary inlet and outlet openings are provided.

The heater or cooler according to the present invention can be made of any suitable material permitting of being formed into such heaters or coolers. With respect in particular to the embodiments disclosed in Figs. 8 and 9, the load on the walls of the heater or cooler will not be so great but that non-corrosive metals can be used to advantage as a construction material for the same. The metals which in addition to iron may come to use and which, as a matter of fact, are superior to iron for the purpose in question, are: aluminum, copper, zinc and alloys such as brass, non-corrosive iron, dur-aluminum and others. The joining around the outer edges can be advantageously effected by dip-soldering, which is done by submerging the heater or cooler into a bath of molten soldering metal covered by a suitable layer of an oxide-purifying slag, the slag bath then cleaning the surfaces to be soldered, whereupon these surfaces are melted together when reaching the surface of the metal bath.

The heater or cooler can be arranged both for horizontal and vertical mounting as well as for an inclined position. In addition to the embodiments of the interlocking corrugations set forth, a plurality of other embodiments for the same purpose may obviously be constructed. Likewise, the invention may be applied to other cooling and heating purposes, and is not strictly limited to a direct application in heaters and coolers.

What I claim is:—

1. In a heat exchange device, a pair of longitudinally corrugated plates arranged with the corrugations of one plate extending into the corrugations of the other plate, said plates being transversely corrugated along a plurality of longitudinally disposed lines to bring portions of the plates into interlocking engagement to prevent relative lateral movement of the plates.

2. A heat exchange device as set forth in claim 1, wherein the said transverse corrugations divide the space between said plates into a plurality of longitudinally disposed chambers having transverse passages between adjacent chambers.

3. In a heat exchange device, a pair of longitudinally corrugated plates arranged with the corrugations of one plate extending into the corrugations of the other plate to define a space which in transverse section is of wave form, one of said plates being provided, along a plurality of longitudinally disposed lines, with spaced portions which are offset into engagement with the other plate, whereby the plates are reinforced against collapse from external pressure.

4. In a heat exchange device, a pair of longitudinally corrugated plates arranged with the corrugations of one plate extending into the corrugations of the other plate to define a space which in transverse section is of wave form; said plates being provided, along a plurality of longitudinally disposed lines, with spaced portions which are offset towards and interlocked with each other to prevent relative transverse movement of said plates.

5. In a heat exchange device, a pair of longitudinally corrugated plates arranged with the corrugations of one plate extending into the corrugations of the other plate to define a space which in transverse section is of wave form; each of said plates, at the portion thereof which lies within a corrugation of the other plate, being provided with a plurality of portions which are extended into engagement with the opposed portion of the said other plate to reinforce the plates against collapse from external pressure.

6. A heat exchange device as set forth in claim 4, wherein the spaced portions offset from one plate form spaced shoulders between which is received the corresponding portions offset from the other plate.

7. A heat exchange device as set forth in claim 4, wherein each of said plates is provided with portions offset into engagement with the other plate to reinforce said plates against collapse from external pressure.

8. In a heat exchange device, a pair of corrugated or wave-shaped plates arranged with the corrugations of one plate extending within and intermeshing with the corrugations of the other plate to define spaces between the plates for confining a fluid for effecting heat exchange, and said plates being of such configuration that the intermeshing portions of the plates lock them against relative movement outwardly from each other.

9. In a heat exchange device, a pair of corrugated or wave-shaped plates arranged with the corrugations of one plate extending within and intermeshing with the corrugations of the other plate to define spaces between the plates for confining a fluid for effecting heat exchange, said plates being provided with relatively offset portions interlocked with each other to prevent relative outward movement of said plates.

10. A heat exchange device as set forth in claim 9, wherein the portions offset from one plate form shoulders engaging the corresponding portions offset from the other plate.

11. In a heat exchange device, a pair of longitudinally corrugated plates arranged with the corrugations of one plate extending within the corrugations of the other plate, portions of the said plates being in engagement along a plurality of longitudinally disposed lines and said plates being of such configuration that the engagement of said engaging portions interlocks the said plates against relative lateral movement.

12. A heat exchange device as set forth in claim 11, wherein the said engaging portions of the plates divide the space between said plates into a plurality of longitudinally disposed chambers.

In testimony whereof I affix my signature.

DAVID WERNER BERLIN.